UNITED STATES PATENT OFFICE

HERMANN WAGNER, OF BAD-SODEN-ON-THE-TAUNUS; OTTO SOHST, DECEASED, LATE OF FRANKFORT-ON-THE-MAIN-HOCHST, BY ADELE SOHST, ADMINISTRATRIX, OF FRANKFORT-ON-THE-MAIN-HOCHST; AND JOSEPH RACHOR, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

AZO DYESTUFFS

No Drawing. Application filed August 27, 1928, Serial No. 302,432, and in Germany September 19, 1927.

Our present invention relates to new azo dyestuffs, more particularly to azo dyestuffs of the following general formula:

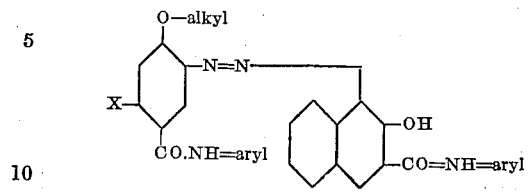

wherein X stands for halogen or O—alkyl.

We have found that red to Bordeaux-red azo dyestuffs of remarkable fastness properties are obtained by coupling a compound of the following general formula:

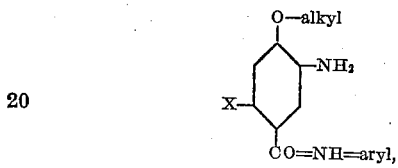

wherein X stands for halogen or O—alkyl. with any 2.3-hydroxynaphthoic acid arylamide. The vivid deep Bordeaux-red and red dyeings obtainable therewith are distinguished by good fastness properties, particularly by an excellent fastness to chlorine. If in the preceding formula, X stands for a halogen, the dyeings are remarkable for a good fastness to light.

The dyestuffs may be produced in substance or on the fiber or on another substratum.

The following examples illustrate the invention, but they are not intended to limit it.

(1) The yarn is impregnated with the following solution: 4.5 g. of 2.3-hydroxynaphthoic acid-5'-chloro-2'-toluidide are made into a paste with 9 ccm. of Turkey red oil of 50 per cent strength and 9 ccm. of caustic soda solution of 34° Bé. and the paste is dissolved with hot water, if desired while boiling. While the solution is cooling, 4.5 ccm. of formaldehyde of 30 per cent strength are added thereto and the whole is made up with water to 1 liter. The impregnated yarn is wound off and developed with the following diazo solution:

3 g. of 3-amino-4.6-diethoxy-1-benzoic acid anilide are diazotized in the cold with 2.6 ccm. of hydrochloric acid of 22° Bé. and 0.72 g. of sodium nitrite dissolved in water. The diazo solution is neutralized with about 2 g. of sodium acetate until the mass shows a neutral reaction towards Congo paper and the whole is then made up with water to 1 liter.

After dyeing the material is well washed and soaped. Thus a vivid very bluish-red dyeing is obtained of very good fastness properties, particularly an excellent fastness to chlorine.

The dyestuff obtainable according to this example has the formula:

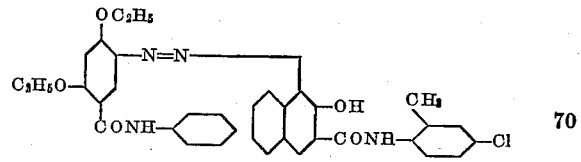

By substituting for the 2.3-hydroxynaphthoic acid-5-chloro-2-toluidide a corresponding quantity of 2.3-hydroxynaphthoic acid-α-naphthalide, or of 2.3-hydroxynaphthoic acid-para-anisidide or of 2.3-hydroxynaphthoic acid-ortho-toluidide, Bordeaux-red dyeings are obtained of similar fastness properties.

(2) The yarn is impregnated with the following solution: 4.5 g. of 2.3-hydroxynaphthoic acid-α-naphthalide are made into a paste with 9 ccm. of Turkey red oil of 50 per cent strength and 13.5 ccm. of caustic soda solution of 34° Bé. and the paste is dissolved with hot water, if necessary while boiling. Whilst the solution is cooling, 4.5 ccm. of formaldehyde of 30 per cent strength are added thereto and the whole is made up with water to 1 liter. The impregnated yarn is wound off and padded with the following diazo solution:

2.76 g. of 3-amino-4-methoxy-6-chloro-1-benzoic acid-anilide are diazotized with 2.6 ccm. of hydrochloric acid of 22° Bé. and 0.72 g. of sodium nitrite in the cold. When the diazotization is complete, the mass is neutralized with 2 g. of sodium acetate and made up with water to 1 liter. After dyeing the material is well washed and soaped. Thus a Bordeaux-red dyeing is obtained of very good fastness properties.

The dyestuff has the following formula:

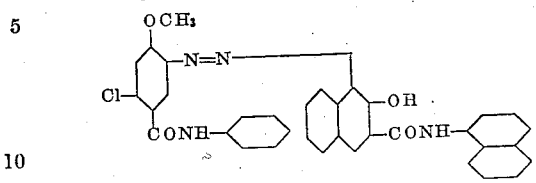

By using in the preceding example instead of 2.3-hydroxynaphthoic acid-α-naphthylamide a corresponding quantity of 2.3-hydroxynaphthoic acid-para-anisidide, or 2.3-hydroxynaphthoic acid-2.5-dimethoxyanilide or 2.3-hydroxynaphthoic acid-β-naphthalide, red to Bordeaux-red shades are obtained of similar fastness properties.

By substituting for the 3-amino-4-methoxy-6-chloro-1-benzoic acid-anilide a corresponding quantity of 3-amino-4-ethoxy-6-chloro-1-benzoic acid-anilide or of 3-amino-4-propyloxy-6-chloro-1-benzoic acid-anilide, red to Bordeaux-red dyestuffs are obtained of similar fastness properties.

(3) The material is impregnated with the following solution: 4.5 g. of 2.3-hydroxynaphthoic acid-5-chloro-2-toluidide are made into a paste with 9 ccm. of Turkey red oil 50% and 9 ccm. of caustic soda solution of 34° Bé. and dissolved with hot water, if required while boiling. Whilst the solution is cooling, 4.5 ccm. of formaldehyde of 30 per cent strength are added thereto and the whole is made up with water to 1 liter. The impregnated yarn is wound off and impregnated with the following diazo solution:

3.35 g. of 3-amino-4.6-diethoxy-1-benzoic acid-3'-chloranilide are diazotized in the cold with 4 ccm. of hydrochloric acid of 22° Bé. and 0.72 g. of sodium nitrite dissolved in water. When the diazotization is complete, the mass is neutralized with about 2 g. of sodium acetate and 1.3 g. of sodium carbonate until it is neutral towards Congo paper, and the solution is made up to 1 liter. After dyeing the material is well washed and soaped. Thus a bright Bordeaux-red shade is obtained of good fastness properties.

The dyestuff has the following formula:

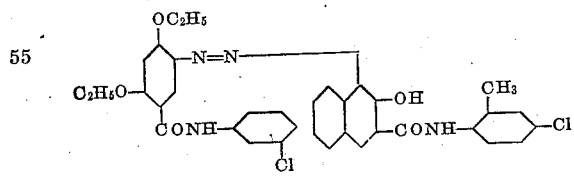

By using instead of 2.3-hydroxynaphthoic acid-5-chloro-2-toluidide a corresponding quantity of 2.3-hydroxynaphthoic acid-5-chloro-2-anisidide, or 2.3-hydroxynaphthoic acid-para-anisidide or 2.3-hydroxynaphthoic acid-α-naphthalide, bright Bordeaux-red shades are obtained of similar fastness properties.

(4) 6.6 g. of 2.3-hydroxynaphthoic acid-anilide are mixed, while stirring, with 5 ccm. of acetone; the mixture is dissolved in 22 ccm. of double normal caustic soda solution and 100 ccm. of water, with the addition of 1.3 g. of Turkey red oil, and by dilution with water the solution is made up to 200 ccm. and filtered. This solution is run into a diazo solution prepared in the usual manner from 6.8 g. of 3-amino-4.6-dimethoxy-benzoic acid-anilide to which 19 ccm. of 2/n sodium acetate solution and 44 ccm. of 2/n acetic acid have been added. The resulting Bordeaux-red dyestuff is filtered by suction and utilized in the form of a paste. It has the formula:

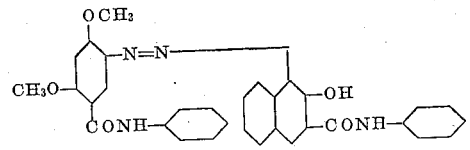

By using instead of 2.3-hydroxynaphthoic acid-anilide a corresponding quantity of 2.3-hydroxynaphthoic acid-5-chloro-2-anisidide, or 2.3-hydroxynaphthoic acid-para-anisidide or 2.3-hydroxynaphthoic acid-ortho-toluidide, similar dyestuffs are obtained.

We claim:

1. As new products, azo dyestuffs of the following general formula:

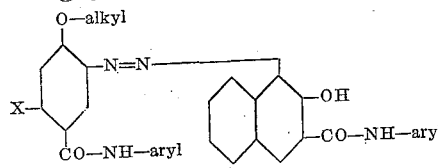

wherein X stands for halogen or O—alkyl. being red to Bordeaux-red powders dyeing shades of good fastness properties.

2. As new products, azo dyestuffs of the following general formula:

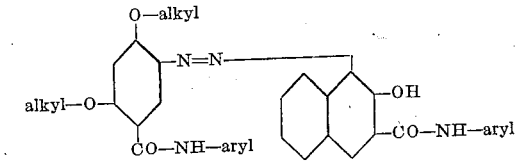

being red to Bordeaux-red powders dyeing shades of good fastness properties.

3. As new products, azo dyestuffs of the following general formula:

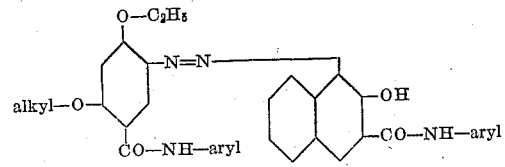

being red to Bordeaux-red powders dyeing shades of good fastness properties.

4. As new products, azo dyestuffs of the following general formula:

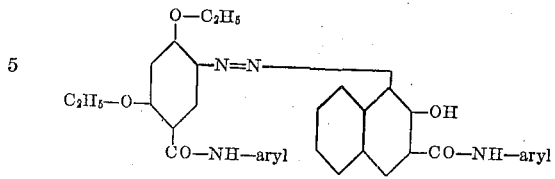

being red to Bordeaux-red powders dyeing shades of good fastness properties.

5. As new products, azo dyestuffs of the following general formula:

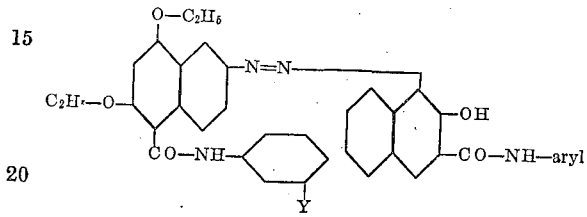

wherein Y stands for hydrogen or halogen, being red to Bordeaux-red powders dyeing shades of good fastness properties.

6. As new products, azo dyestuffs of the following general formula:

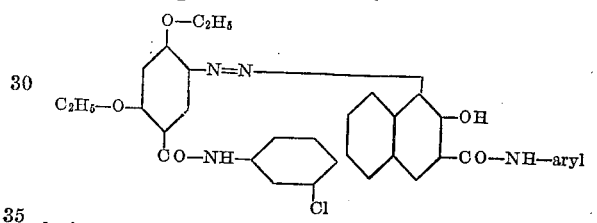

being red to Bordeaux-red powders dyeing shades of good fastness properties.

7. As a new product, the azo dyestuff of the formula:

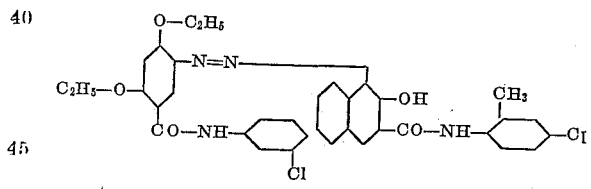

being Bordeaux-red powder dyeing the material a bright Bordeaux-red shade of good fastness properties.

In testimony whereof, we affix our signatures.

HERMANN WAGNER.
ADELE SOHST,
*Administratrix of Otto Sohst, Deceased.*
JOSEPH RACHOR.